United States Patent
Acker et al.

(10) Patent No.: US 9,365,180 B2
(45) Date of Patent: Jun. 14, 2016

(54) VEHICLE PASSENGER PROTECTION SYSTEM

(71) Applicant: TRW Automotive GmbH, Alfdorf (DE)

(72) Inventors: Dominique Acker, Gschwend (DE); Marco Wahl, Sulzbach-Laufen (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/395,858

(22) PCT Filed: Apr. 23, 2013

(86) PCT No.: PCT/EP2013/001224
§ 371 (c)(1),
(2) Date: Oct. 21, 2014

(87) PCT Pub. No.: WO2013/159917
PCT Pub. Date: Oct. 31, 2013

(65) Prior Publication Data
US 2015/0115576 A1    Apr. 30, 2015

(30) Foreign Application Priority Data
Apr. 26, 2012  (DE) .................. 10 2012 008 391

(51) Int. Cl.
*B60R 21/207*    (2006.01)
*B60R 21/231*    (2011.01)

(52) U.S. Cl.
CPC ......... *B60R 21/23138* (2013.01); *B60R 21/207* (2013.01); *B60R 2021/23146* (2013.01); *B60R 2021/23161* (2013.01)

(58) Field of Classification Search
CPC ............ B60R 21/207; B60R 21/23138; B60R 2021/23146; B60R 2021/23161; B60R 2021/23308
See application file for complete search history.

(56) References Cited

U.S. PATENT DOCUMENTS

| | | | | |
|---|---|---|---|---|
| 5,499,840 A | * | 3/1996 | Nakano ...................... | 280/730.1 |
| 5,507,519 A | * | 4/1996 | Schettler-Kohler ........ | 280/730.1 |
| 5,556,128 A | | 9/1996 | Sinnhuber et al. | |
| 5,829,779 A | * | 11/1998 | Nakashima et al. ....... | 280/730.2 |
| 5,913,536 A | * | 6/1999 | Brown ........................ | 280/730.2 |
| 6,155,598 A | * | 12/2000 | Kutchey .................... | 280/730.2 |
| 6,966,576 B1 | * | 11/2005 | Greenstein ................ | 280/730.1 |
| 7,971,901 B2 | * | 7/2011 | Tomitaka et al. .......... | 280/730.2 |
| 7,997,615 B2 | * | 8/2011 | Jang ........................... | 280/743.1 |
| 8,210,566 B2 | * | 7/2012 | Fukawatase et al. ...... | 280/730.1 |
| 8,267,424 B2 | * | 9/2012 | Tomitaka et al. .......... | 280/730.2 |
| 8,353,529 B2 | * | 1/2013 | Tomitaka et al. .......... | 280/730.2 |

(Continued)

FOREIGN PATENT DOCUMENTS

| | | |
|---|---|---|
| DE | 19541513 | 5/1996 |
| DE | 102009014103 | 10/2009 |

(Continued)

*Primary Examiner* — Laura Freedman
(74) *Attorney, Agent, or Firm* — Tarolli, Sundhiem, Covell & Tummino LLP

(57) ABSTRACT

A vehicle occupant protection system comprises an airbag (20) which in the folded state is accommodated in a backrest (14) of a vehicle seat (12) and in the deployed state extends between two seats (12, 52) of the vehicle. The airbag (20) includes a thorax zone (36) for laterally covering the thorax of a vehicle occupant (40) and a head zone (38) for laterally covering the head (42) of the vehicle occupant (40). The head zone (38) extends against the longitudinal vehicle direction (R) up to behind a headrest (18) of the vehicle seat (12) and completely covers the headrest (18) on the side.

10 Claims, 2 Drawing Sheets

(56) References Cited

U.S. PATENT DOCUMENTS

| | | | |
|---|---|---|---|
| 8,414,018 B2 * | 4/2013 | Choi et al. | 280/730.1 |
| 8,474,863 B2 * | 7/2013 | Rick | 280/730.2 |
| 8,684,408 B2 * | 4/2014 | Thomas et al. | 280/743.2 |
| 8,702,122 B2 * | 4/2014 | Tomitaka et al. | 280/730.2 |
| 8,924,086 B2 * | 12/2014 | Thomas | 701/45 |
| 8,985,625 B2 * | 3/2015 | Gwon et al. | 280/743.1 |
| 9,004,526 B2 * | 4/2015 | Fukawatase et al. | 280/730.1 |
| 9,016,718 B2 * | 4/2015 | Fukawatase et al. | 280/730.2 |
| 2003/0155751 A1 * | 8/2003 | Aulbach et al. | 280/730.2 |
| 2006/0131845 A1 * | 6/2006 | Belwafa et al. | 280/729 |
| 2009/0001695 A1 * | 1/2009 | Suzuki et al. | 280/730.2 |
| 2009/0243268 A1 | 10/2009 | Suzuki et al. | |
| 2009/0302584 A1 | 12/2009 | Sugimoto et al. | |
| 2011/0074141 A1 | 3/2011 | Wipasuramonton et al. | |
| 2013/0079208 A1 * | 3/2013 | Wiik et al. | 493/405 |
| 2014/0042733 A1 * | 2/2014 | Fukawatase | 280/730.2 |
| 2014/0375033 A1 * | 12/2014 | Fukawatase | 280/729 |
| 2015/0084315 A1 * | 3/2015 | Acker et al. | 280/728.2 |
| 2015/0197209 A1 * | 7/2015 | Fujiwara | B60R 21/231 280/730.1 |
| 2015/0203065 A1 * | 7/2015 | Egusa | B60N 2/468 280/730.2 |
| 2015/0274110 A1 * | 10/2015 | Ishida | B60R 21/01512 280/729 |
| 2015/0274111 A1 * | 10/2015 | Ishida | B60R 21/207 280/730.2 |
| 2015/0274113 A1 * | 10/2015 | Nagasawa | B60R 21/207 280/730.2 |

FOREIGN PATENT DOCUMENTS

| | | | |
|---|---|---|---|
| EP | 2050630 | | 4/2009 |
| JP | 2011005908 A | * | 1/2011 |

* cited by examiner

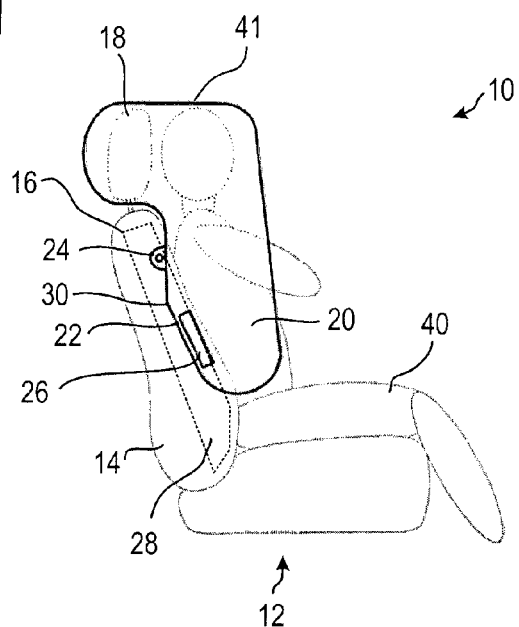
Fig. 1
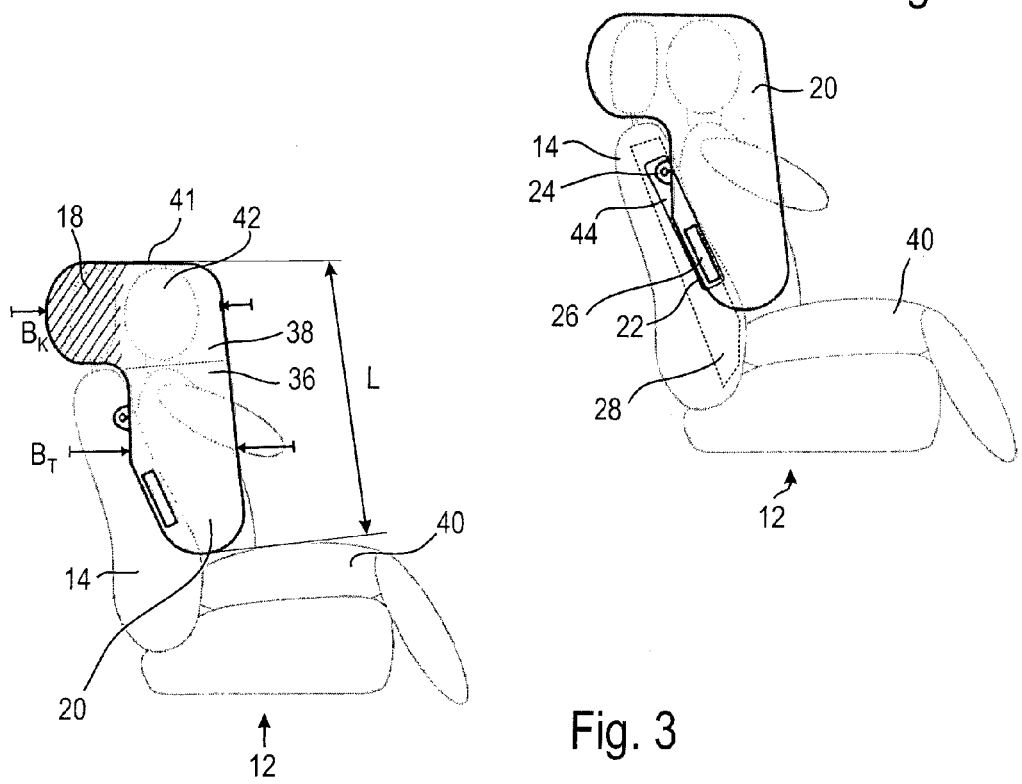
Fig. 2
Fig. 3

VEHICLE PASSENGER PROTECTION SYSTEM

RELATED APPLICATIONS

This application corresponds to PCT/EP2013/001224, filed Apr. 23, 2013, which claims the benefit of German Application No. 10 2012 008 391.2, filed Apr. 26, 2012, the subject matter of which are incorporated herein by reference in their entirety.

BACKGROUND OF THE INVENTION

The invention relates to a vehicle occupant protection system comprising an airbag.

Considerations have been made to arrange an airbag between two vehicle seats so as to prevent collision of the vehicle occupants in the case of a side crash. Such vehicle occupant protection system is described, for example, in DE 10 2009 014 103 A1. The catching distance for such vehicle occupant protection system is short and the airbag must have a relatively large surface so as to offer appropriate protection in various crash situations.

SUMMARY OF THE INVENTION

It is the object of the invention to provide a vehicle occupant protection system which reliably protects the occupants on neighboring vehicle seats especially with an offset seating position.

In accordance with the invention, this is achieved in a vehicle occupant protection system by an airbag which in the folded state is accommodated in a backrest of a vehicle seat and in the deployed state extends between two seats of the vehicle. The airbag has a thorax zone for laterally covering the thorax of a vehicle occupant and a head zone for laterally covering the head of the vehicle occupant. The head zone extends against the longitudinal vehicle direction to behind a headrest of the vehicle seat and completely covers the headrest on the side. Especially during crash of a vehicle occupant seated backwards offset on a neighboring vehicle seat this shape of the airbag ensures that the two vehicle occupants do not collide and that the vehicle occupant seated on a neighboring seat is safely caught by the airbag. At the same time, also appropriate protection is ensured for the vehicle occupant seated on the vehicle seat in which the airbag is accommodated.

The airbag is especially is especially configured to catch the vehicle occupant on a neighboring vehicle seat. For this purpose, the airbag deploys just as known side airbags out of the backrest of the vehicle seat, but it is arranged on the side facing a neighboring vehicle seat in the backrest and not in the seat side facing the vehicle wall or door.

The airbag extends substantially in a plane between the vehicle seats and approximately in parallel to a vehicle side wall. The backrest does not include the headrest which is considered to be a separate part connected to the upper end of the backrest in this case.

The head zone of the airbag extends in the longitudinal vehicle direction preferably to in front of the head of the vehicle occupant, wherein the large head zone offers excellent protection especially for the heads of the vehicle occupants, when the seats are arranged offset forward or backward against each other.

The head zone of the airbag has an upper end which preferably extends beyond an upper end of the headrest so that also in this case over the entire headrest a safe restraining effect is ensured for a vehicle occupant seated on a neighboring vehicle seat.

Therefore also the head zone is preferably configured to be so large that the headrest and the head of the vehicle occupant seated on the vehicle seat are completely covered.

The thorax zone of the airbag can be selected to exhibit a definitely narrower than the head zone, especially the width of the head zone can be approximately by ⅓ larger than to twice as large as the width of the thorax zone. The width is measured in the longitudinal extension of the airbag in the longitudinal direction of the vehicle. This configuration permits keeping the filling volume of the airbag relatively small, which contributes to rapid deployment and inexpensive manufacture. It is nevertheless guaranteed that the airbag offers excellent head protection for the two vehicle occupants seated next to each other.

This configuration results in the fact that in the deployed state the airbag may have an L shape, wherein the L is upside down in the inflated and vehicle-mounted state.

The airbag may consist of two substantially identical cut portions which are interconnected along a peripheral fastening. The cut portions can also be integrally connected on one side or the entire airbag can be manufactured by interweaving. This manufacture is known from classical side airbags and renders the airbag suited for inexpensive manufacture.

In order to reduce the movements of the airbag during deployment and to stabilize the airbag per se in its position at the vehicle seat, a first fastening portion which is provided directly on an inflator supplying filling gas for the airbag can be provided on the airbag and a second fastening portion which is arranged between the first fastening portion and an upper end of the backrest can be provided on the airbag.

BRIEF DESCRIPTION OF THE DRAWINGS

Hereinafter the invention shall be described in detail by way of two embodiments with respect to the enclosed drawings, in which:

FIG. 1 shows a schematic side view of a vehicle occupant protection system according to the invention in accordance with a first embodiment;

FIG. 2 shows a schematic side view of a vehicle occupant protection system according to the invention in accordance with a second embodiment;

FIG. 3 shows a further schematic view of a vehicle occupant protection system according to the invention;

DESCRIPTION OF EMBODIMENTS

Figure 4:
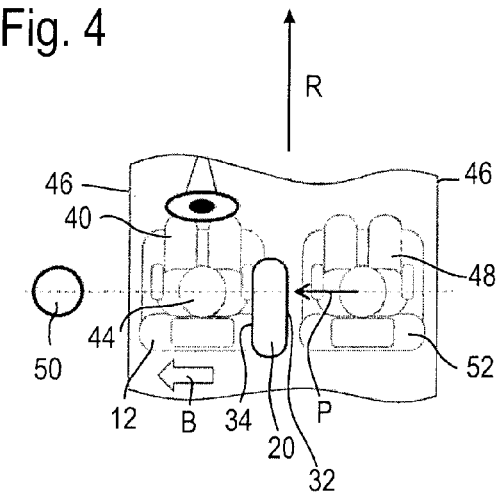
FIG. 4 shows a schematic top view onto a vehicle occupant protection system according to the invention in the case of a purely lateral pole impact with the seating positions being on the same level.

FIG. 1 illustrates a vehicle occupant protection system 10 comprising a vehicle seat 12 having a seat cushion and a backrest 14 extending upwards. At an upper end 16 of the backrest 14 a separate headrest 18 is arranged.

An airbag 20 having the shape of a large inverted L in the deployed and inflated state is fastened to the backrest 14 and, before being activated, is accommodated in the backrest 14 in a known manner (not shown).

The airbag 20 includes two fastening portions 22, 24 at which it is connected to the backrest 14.

The first fastening portion 22 is arranged directly at an inflator 26 supplying the filling gas for the airbag 20. For example, it consists of one or two apertures in the airbag 20 through which fastening bolts of the inflator 26 (not shown) are passed. The fastening bolts of the inflator 26 are fastened to a frame 28 of the backrest 14 in a known manner.

The second fastening portion 24 is formed by an eyelet at a peripheral fastening 30 of the airbag 20 in this case.

The peripheral fastening 30 can be formed, for example, by stitching or interweaving two cut portions 32, 34 constituting the airbag 20 (indicated in FIG. 4).

The airbag 20 is (theoretically) divided into a thorax zone 36 and a head zone 38 directly connected thereto (cf. FIG. 3). The thorax zone 36 has a width $B_T$ in the longitudinal vehicle direction R (cf. FIG. 4) and approximately perpendicular to the longitudinal extension L of the airbag 20 along the backrest 14 which amounts to approximately half to ⅔ of the width $B_K$ of the head zone 38. The head zone 38 thus has a definitely larger width $B_K$ than the thorax zone 36 of the airbag 20.

The width $B_T$ of the thorax zone 36 is selected to be so large, however, that the entire thorax of the vehicle occupant 40 seated on the vehicle seat 12 is covered. The width $B_K$ of the head zone 38 is selected to be so large and the head zone 38 of the airbag 20 is arranged so that both the head 42 of the vehicle occupant 40 and the headrest 18 are completely covered on the side. In this way a characteristic inverted L shape is imparted to the airbag 20.

The second fastening portion 24 is arranged at the thorax zone 36 of the airbag 20. In the embodiment illustrated in FIG. 1 the second fastening portion 24 is fastened directly to the frame 28 of the backrest 14, for example by a screw projecting through the eyelet of the fastening portion 24.

The second fastening portion 24 is located somewhat beneath the upper end 16 of the backrest 14, for example 10 to 30 cm deeper. The second fastening portion 24 thus is arranged somewhat beneath the shoulder of the vehicle occupant 40, as is evident from FIGS. 1 to 3, wherein the vehicle occupant 40 shown here represents a 95% male dummy.

In the illustrated example, the second fastening portion 24 is located approximately in the middle between the upper end 16 of the backrest 14 and the first fastening portion 22 level with the inflator 26 and thus somewhat spaced apart from the (theoretical) limit between the head zone 38 and the thorax zone 36 (cf. FIG. 3).

The head zone 38 of the airbag 20 extends against the longitudinal vehicle direction R laterally to behind the headrest 18 of the vehicle seat 12. An upper end 41 of the airbag 20 extends beyond an upper end of the headrest 18.

In the longitudinal vehicle direction R the head zone 38 of the airbag extends up to in front of the head 42 of the vehicle occupant 40 on the vehicle seat 12 to which the airbag 20 is fastened (in this case the driver seat).

The head zone 38 is so large that the head 44 of the vehicle occupant 40 seated on the vehicle seat 12 is completely covered, just as the headrest 18 of the vehicle seat 12, by the head zone 38 viewed from the side.

In the embodiment illustrated in FIG. 2 the second fastening portion 24 is not directly fastened to the frame 28 of the backrest 14 but to a fastening component 44 separate from the frame 28. The separate fastening component 44 in this case is an elongate fastening sheet extending from the second fastening portion 24 to the lower end of the inflator 26.

The first fastening portion 22, too, is connected to the fastening component 44.

For instance, the fastening component 44 includes apertures (not shown) through which the fastening bolts of the inflator 26 are protruding and by which the fastening component 44 is fastened to the frame 28 of the backrest 14.

A second fastening point of the fastening component 44 is preferably predefined by the fixing of the second fastening portion 24 to the frame 28 of the backrest 14.

The airbag 20, the inflator 26 and the fastening component 44 may constitute a pre-mounted subassembly which is screwed together for mounting the airbag system on the frame 28.

The airbag 20 is arranged on the side of the vehicle seat 12 facing away from a side wall 46 or door of the vehicle.

In FIGS. 4 to 7 the situation for an airbag 20 on a vehicle seat is shown, wherein the airbag 20 has deployed between the vehicle seat 12 and a passenger seat 52.

In the case of a side impact (shown here by the situation during a pole test) onto an obstacle 50 located next to the vehicle side wall 46 adjacent to the driver seat 12, the airbag 20 is intended to absorb a movement of the passenger 48 seated on the passenger seat 52.

FIG. 4 illustrates a situation in which the vehicle is orientated in the longitudinal vehicle direction R and performs a movement directed perpendicularly to the direction R with respect to the obstacle 50 (arrow B). Perpendicularly to the direction R, the driver seat 12 and the passenger seat 52 are arranged at the same level.

In the case of impact onto the obstacle 50, due to the inertia forces the passenger 48 will perform a movement toward the airbag 20 which has deployed and inflated between the passenger seat 52 and the driver seat 12 (indicated by the arrow P).

Based on the geometry of the airbag 20, in this case the passenger 48 strikes the thorax zone 36 and the head zone 38 of the airbag 20 by his/her thorax and head.

Figure 5:
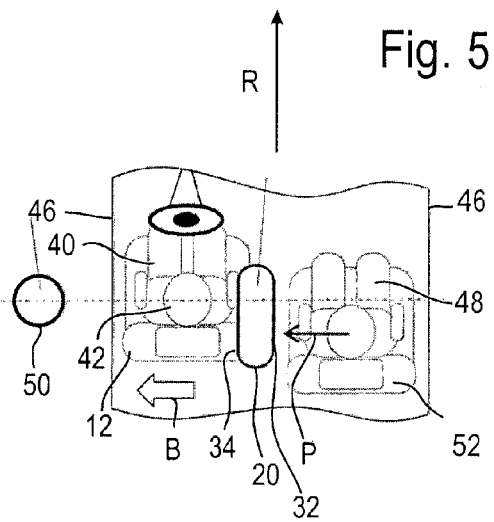
FIG. 5 shows a schematic top view onto a vehicle occupant protection system according to the invention in the case of purely lateral pole impact with the seating positions being offset.

FIG. 5 illustrates a crash situation in which the vehicle moves equally perpendicularly to the longitudinal vehicle direction R toward the obstacle 50. In this case, however, the passenger seat 52 is set back somewhat vis-à-vis the driver seat 12 relative to a plane perpendicular to the direction R.

In this case, too, the passenger 48 is protected by the airbag 20. The head of the passenger 48 is absorbed by the head zone 38 of the airbag 20, especially in the portion which completely covers the headrest 18 of the driver seat 12 laterally and in the height.

Figure 6:
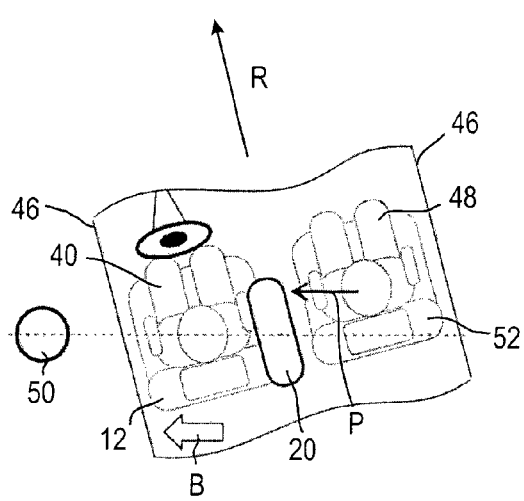
FIG. 6 shows a schematic top view onto a vehicle occupant protection system according to the invention in the case of an inclined pole impact with the seating positions being on the same level.
Figure 7:
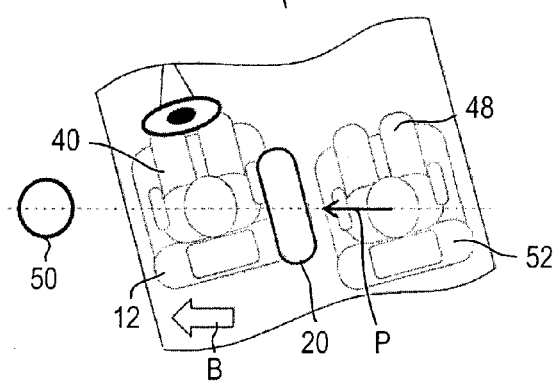
FIG. 7 shows a schematic top view onto a vehicle occupant restraint system according to the invention in the case of an inclined pole impact with the seating positions being offset.

FIGS. 6 and 7 illustrate a crash situation in the case of an inclined lateral crash in which the longitudinal vehicle direction B of the vehicle relative to the obstacle 50 is inclined relative to the direction of movement R of the vehicle in the longitudinal vehicle direction.

In the situation shown in FIG. 6 the driver seat 12 and the passenger seat 52 are arranged at the same level related to a plane perpendicular to the direction R.

Also in this case the passenger 48 is caught by the airbag 20 at the driver seat 12. As is illustrated by the arrow P, in each case the passenger 48 impacts on the head zone 38 of the airbag 20.

In the crash situation illustrated in FIG. 7 the passenger seat 52 and the driver seat 12 are offset against each other related to a plane perpendicular to the longitudinal vehicle direction R, wherein the passenger seat 52 is displaced somewhat backwards again.

In this case, too, the passenger 48 is safely caught by the airbag 20, wherein he/she strikes primarily the thorax zone 36 as well as the entire head zone 38 of the airbag 20, as is illustrated by the arrow P.

As is shown by way of the different crash situations, it is sufficient to arrange only one single airbag 20 between the vehicle seats 12, 52 so as to be able to safely protect both the driver 40 and the passenger 48.

In the case of crash on the passenger side, the airbag 20 inversely serves as protection for the driver. It is also possible, as a matter of course, to mount the airbag 20 on the passenger seat 52 or to provide a further airbag on the passenger seat 52.

Apart from the illustrated airbag 20, in the vehicle further known airbags can be arranged in the area of the side walls 46, in the steering wheel and/or an instrument panel, as a matter of course.

The invention claimed is:

1. A vehicle occupant protection system for a vehicle having at least two seats, the vehicle occupant protection system comprising an airbag (20) which in a folded state is accommodated in a backrest (14) of a first vehicle seat (12) and in a deployed state extends between the first vehicle seat and a second vehicle seat (12, 52) of the vehicle, the airbag having a forward most extent and a rearward most extent measured with respect to a longitudinal vehicle direction (R),
wherein the airbag (20) has a thorax zone (36) for laterally covering the thorax of a vehicle occupant (40) and a head zone (38) for laterally covering the head (42) of the vehicle occupant (40), the rearward most extent of the airbag in the thorax zone being located forward of the rearward most extent of the airbag in the head zone when the airbag is in an inflated state,
in the inflated state of the airbag the head zone (38) extends rearward in the longitudinal vehicle direction (R) up to behind a headrest (18) of the first vehicle seat (12) and completely covers the headrest (18) on a lateral side of the headrest,
wherein the airbag (20) consists of two substantially identical cut portions (32, 34) which are interconnected along a peripheral fastening (30).

2. The vehicle occupant protection system according to claim 1, wherein in the inflated state of the airbag the head zone (38) of the airbag (20) is configured to extend in the longitudinal vehicle direction (R) forward of the head (42) of the vehicle occupant (40).

3. The vehicle occupant protection system according to claim 1, wherein in the inflated state of the airbag the head zone (38) of the airbag (20) has an upper end (41) extending beyond an upper end of the headrest (18).

4. The vehicle occupant protection system according to claim 1, wherein in the inflated state of the airbag the head zone (38) is configured to be so large that the headrest (18) and the head (42) of the vehicle occupant (40) are completely covered.

5. The vehicle occupant protection system according to claim 1, wherein in the inflated state of the airbag a width ($B_K$) of the head zone (38) is approximately twice as large as a width ($B_T$) of the thorax zone (36) measured along the longitudinal direction of the vehicle.

6. The vehicle occupant protection system according to claim 1, wherein the airbag (20) is L-shaped in the deployed state.

7. The vehicle occupant protection system according to claim 1, wherein the airbag (20) is configured to catch the vehicle occupant (48) seated on the second vehicle seat (52).

8. The vehicle occupant protection system according to claim 1, wherein the airbag inflates in a direction substantially perpendicular to the longitudinal vehicle direction.

9. The vehicle occupant protection system according to claim 1, wherein the airbag has a first width along the longitudinal vehicle direction at the thorax zone and a second width along the longitudinal vehicle direction at the head zone, the second width being greater than the first width.

10. A vehicle occupant protection system for a vehicle having at least two seats, the vehicle occupant protection system comprising an airbag (20) which in a folded state is accommodated in a backrest (14) of a first vehicle seat (12) and in a deployed state extends between the first vehicle seat and a second vehicle seat (12, 52) of the vehicle, the airbag having a forward most extent and a rearward most extent measured with respect to a longitudinal vehicle direction (R),
wherein the airbag (20) has a thorax zone (36) for laterally covering the thorax of a vehicle occupant (40) and a head zone (38) for laterally covering the head (42) of the vehicle occupant (40), the rearward most extent of the airbag in the thorax zone being located forward of the rearward most extent of the airbag in the head zone when the airbag is in an inflated state,
in the inflated state of the airbag the head zone (38) extends rearward in the longitudinal vehicle direction (R) up to behind a headrest (18) of the first vehicle seat (12) and completely covers the headrest (18) on a lateral side of the headrest,
wherein a first fastening portion (22) which is provided directly on an inflator (26) supplying filling gas for the airbag (20) is provided on the airbag (20) and a second fastening portion (24) which is arranged between the first fastening portion (22) and an upper end (16) of the backrest (14) is provided on the airbag (20).

* * * * *